Feb. 20, 1945.  J. F. WERDER  2,370,099
LIQUID LEVEL GAUGE
Filed Feb. 3, 1944
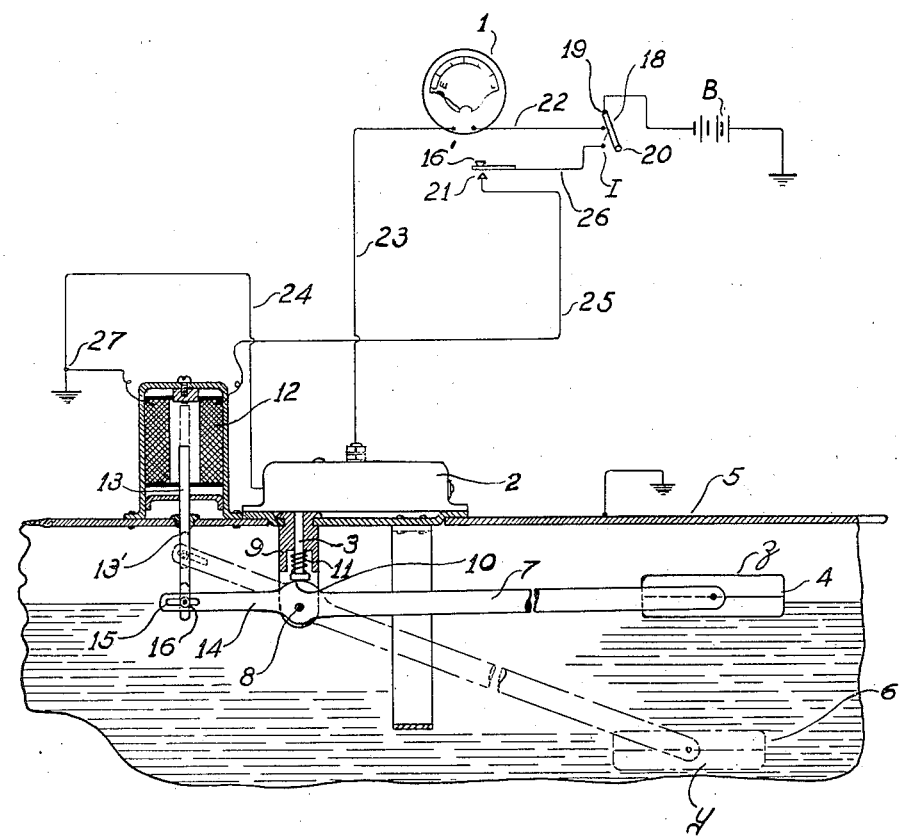
INVENTOR.
John F. Werder
BY Frank M. Slough.
ATTY.

Patented Feb. 20, 1945

2,370,099

UNITED STATES PATENT OFFICE 2,370,099

LIQUID LEVEL GAUGE

John F. Werder, Chagrin Falls, Ohio

Application February 3, 1944, Serial No. 520,975

3 Claims. (Cl. 73—313)

My invention relates to liquid level gauges and relates more particularly to a feature of improvement applicable to many types of liquid level gauges which depends upon the position of a float element immersed in the liquid to control, by its position of elevation, the operation of a gauge instrument disposed at a distance from said float.

At the present time, liquid level gauges commonly employ a float to control the adjustment of an adjustable primary controller mounted on the tank, or other receptacle containing liquid, for controlling the operation of a remotely disposed gauge either through a fluid pressure line or electrical circuit conductors interconnecting said gauge and primary controller.

In many cases, efforts have been made to employ float controlled remotely disposed indicator systems to indicate the level of lubricant in the crank case of an internal combustion engine employed in automobiles or involving like conditions of accumulated sludge which commonly settles towards the bottom of the crank case but which is variously dispersed to other portions of the liquid from time to time.

I have found that in many instances the indications remotely effected by the position of the float have been so highly unreliable that the use of such a float in automotive engine crank cases has, in recent years, been largely discontinued. This, for the reason that the float tends to "stick" at various float levels which may not at all coincide with the amount of lubricant including such sludge in the crank case. Instances have been known where, due to the effect of such sludge, the float will stick in the "up" position thereby giving a remote indication of "full," although as a matter of fact, the supply of lubricant in the crank case has been seriously depleted with consequent damage to the engine, engine cylinders and bearings.

Again, occasionally when the vehicle is not in perfectly horizontal position "fore-and-aft" or laterally, the hinging connection between the float supporting arm and the apparatus of the controller tends to bind. Particularly is this true where the float arm of the float is carried on an arm extending laterally of the controller, for, the float sometimes is immersed to a greater or lesser extent in the body of the liquid, upon the surface of which it is intended to freely ride in order to achieve accurate indicator controlling results.

My present invention provides a means whereby the operator of the automotive vehicle or engine may readily, at any time, check the operativeness and reliability of the float induced indications given by the remotely disposed indicator.

By virtue of the apparatus herein disclosed, means are provided whereby the operator may, at any time, forcibly depress the float below the oil level and maintain it in such lowered position, meanwhile noting any difference, and the degree thereof, in the indication of oil level given by the indicator.

If the indicator then gives a substantially lower oil level reading, the operator will then release the float and note whether or not the resultant increased oil level indication corresponds with that previously given before lowering of the float.

A few successive operations such as that above given will indicate to the operator the true oil level or, on the contrary, in the case of successive readings of varying value, will indicate that the apparatus is not operating correctly and will cause the operator to be put upon inquiry as to whether the sludge should be removed from the crank case, new oil placed therein, or the mechanical or electrical mechanism is at fault.

Such an operation provides ample warning to the operator as to any inaccuracies whereby the operator may eliminate the cause thereof before damage has been done to the engine. Even though the lubricating oil is free of sediment and the apparatus and electrical system is in reasonably good working order, the depression of the float being followed by release thereof, permits the float to surge upwardly and momentarily slightly above its float level from which it then settles on the surface of the liquid at the proper indicating level whereby a more precise indication is often secured than otherwise, especially when the test is made with a cold engine and the vehicle and engine are not in operation, the above achieving the common beneficial effects of vibration achieved when the engine is in operation and/or the vehicle in motion not overcoming slight frictional effects related to the float or mechanical connections thereto.

It is an object therefor of my invention to provide an improved ancillary float controlling means operable whenever a reading of the gauge or indicator is to be made and from the point of observation of the indicator to ensure that the remotely controlled indicating apparatus not only is in proper working order but that the float is freely and properly responsive to the level of the liquid and is not "stuck" at some other than the proper float level at the surface of the liquid.

Another object of my invention is to provide improved means for detecting the presence of sediment or sludge in the lubricant containing crank case of internal combustion engines from a point disposed remotely thereto.

Another object of my invention is to provide an improved ancillary float controlling means operable whenever a reading of the gauge or indicator is to be made and from the point of observation of the indicator to ensure that the float indicator controlling position at the time is that position which the float would properly assume under conditions when the apparatus is properly operative.

Another object of my invention is to provide an improved ancillary float controlling means operable whenever a reading of the gauge or indicator is to be made and from the point of observation of the indicator to ensure that the float is always pre-positioned accurately at the same level with respect to the surface of the liquid.

Other objects of my invention and the invention itself will become more increasingly apparent from the purview of the description and the drawing attached hereto, in which:

The single figure shown is an illustration of the telemetric float controlling means of my invention showing in solid lines the normal position of the float, and in dotted lines several operative positions of the float as effected by the controlling means.

The drawing illustrates an embodiment of my invention applied to an oil level indicating system for purposes of illustrating an application of my invention, the illustrated system being that disclosed in United States Letters Patent No. 1,885,051 dated October 25, 1932, to T. J. Smulski.

Briefly describing the liquid level electrical indicating system of the drawing, at 1 I show an indicator having a graduated scale and indicating hand of the usual type, the movement of the hand being electro-thermally accomplished in a manner well known and disclosed in said patent.

The so-called sender tube 2 comprises a pair of electrical contacts in normally closed circuit relation and maintained in variable pressure contact, the degree of pressure between the contacts being automatically adjustable by variations in the elevation of the plunger 3 which, in turn, is elevated to a degree depending upon the elevation of the float 4 disposed within the liquid container 5, which may be the gasoline tank of an automobile.

The float 4 is commonly made of cork or other light material of low specific gravity and is generally indicated at 6. The float 4 is carried on an arm 7, pivoted at 8, in the member 9 which is secured to and extends downwardly of the casing of the sender 2. In the region generally indicated at 10, the upper surface of the float arm 7 is generally of camming contour and the lower end of the plunger 3 rides upon the cam surfaces 10, being maintained in slight pressure contact therewith by the helical spring 11.

It is sufficient for the purpose of the present application, which is not directed to the liquid level indicating system, per se, to add merely that the position of the needle of the indicator 1 is, at all times, during operation of the system responsive to the elevation of the plunger 3 under the control of the cam portion 10 of the float arm 7.

The apparatus of my invention as applied to the indicating system ensures not only the float mechanism but also the remotely controlled indicating system and apparatus therefor being in proper working order, and said apparatus comprises a solenoid 12 and an armature plunger 13', the plunger being interlinked with a second arm 14 of the float arm element 7 but preferably extending in an opposite direction. The connection between the arm 14 and the plunger rod 13' is preferably accomplished by providing the arm 14 with an elongated slot 15 into which a pin 16, carried by the plunger rod, projects. The push button circuit closure 16, disposed preferably adjacent the indicator 1, is separately carried by the instrument board or, if preferred, may be incorporated into the instrument 1, if desired.

When the float gauge system is, as in the embodiment illustrated, electrically operated, the source of current B is, when the ignition switch shown at I is operated to turn on the ignition of the automobile, connected through the supplemental switch contacts 18 and 19 to both the gauge electrical indicating system and the solenoid 12. This is accomplished by virtue of the fact that the supplemental blade 20 bridges the contacts 18 and 19 and interconnects the ungrounded pole of the battery B through said contacts through a contact 21 of the push button switch 16' to the circuit conductor 22 leading to the indicator 1.

Therefore, with the switch I thrown to closed position, as when the ignition switch of the automobile is closed, current will flow from the battery B through the contacts of switch I and then serially through the circuit conductor 22, the indicator 1, the circuit conductor 23 to the sender 2 which commonly is grounded, or if not, may be grounded, through the circuit conductor 24. At the same time, the supplemental circuit for the solenoid 12 is conditioned for operation by the closure of the contacts 18 and 19.

It will be understood that in the operation of the solenoid, the operator, having first operated the ignition switch I, will note the reading of the indicator 1, and then, before relying upon the indication then given by the indicator 1, will operate the push button switch 16' to effect energization of the solenoid 12. Responsive to such energization, the armature plunger 13 and plunger rod 13' will be drawn upwardly within the solenoid and therefore, by virtue of the slot and pin connection 15 and 16 with the float arm 7, will forcibly depress the float from some such position as indicated at z to the dotted line position y.

Meanwhile, maintaining the push button switch 16'—21 in closed circuit position, the operator will note the consequent lowered position of the indicator needle which should properly take a definite position known to the operator by experience and the operator will thus be able to check the accuracy of the remotely controlled electrical system for such lower float level y.

Subsequent releasing of the push button switch to open the contacts thereof may permit the float 4 to be displaced upwardly by the effect of buoyancy and the force of buoyancy may be sufficiently strong to momentarily cause the float to assume a slightly more elevated position, from which position the float will gently settle upon the surface of the liquid to take the intermediate proper position as shown at z.

The above operation is the normal and expected operation. However, if the crank case oil has been so contaminated by sediment, sludge or the like, or if the mechanical connections between the float arm 7 and the "sender" apparatus 2 bind, due to friction or for any other reason, the operator will be able to detect each difficulty by the varying erratic different indications given by the indicator upon successive operations of the push button and by comparison also with the previously experienced indications given when the float is at the position $y$. In such case, the operator being put upon inquiry will not rely upon the indicating system and will seek the cause of the inaccuracies and remedy the same, usually by replacing the contaminated oil with clean oil.

While the drawing and the foregoing specification illustrate an electrical liquid level indicating system and apparatus therefor, and electro-magnetic actuating means for effecting a preliminary downward movement of the flow to ensure a more accurate indication of liquid level, it will be clear that my invention may be applied to any other float-actuated mechanism or system, since the operation of the apparatus of my invention is not dependent upon any particular means or method for translating movements of the float to an extraneously disposed indicator.

The indicator, at 1, may be of any desired form and its actuation may, for instance, be effected mechanically through a flexible wire or otherwise, as well known in the art. I consider such within the broad purview of my invention, independently of the nature of the indicating apparatus which is variably operated responsive to the position of the float in the liquid.

From the foregoing, other alternative embodiments of my invention and the broader scope thereof will be known and appreciated by those skilled in the art and I am aware that numerous and extensive departures may made from the embodiment herein illustrated and described, without however departing from the spirit of my invention and the scope of the appended claims.

I claim:

1. In combination with a liquid containing receptacle, a float controlled liquid level indicator, a controller carried on the receptacle, said indicator disposed at an operator's station remotely of said receptacle, a float arm pivoted for swinging oscillatory movement in, or nearly in, a vertical plane, a float carried by said arm, said indicator being responsive to varying elevations of said float to indicate the degree of elevation thereof, electro-magnetic means carried by the receptacle adapted when energized to momentarily swing said arm downwardly to depress said float to a substantially lower known level, an electrical switch and a source of current, and electrical circuit conductors interconnecting said switch, said source and said electro-magnetic means whereby when said switch is closed the electromagnetic means will depress the float, and upon opening the switch the float will return to the liquid level surface whereby the operator may compare the indicator reading prior to any depressing actuation of said float to any subsequent reading taken after the float is restored to the surface of the liquid to detect faulty indicating positioning of said float.

2. In combination with a float actuated liquid level indicating system, electrical means for arbitrarily positioning the float thereof, comprising an electro-magnetic device provided with an armature, means interlinking the armature of said device and said float to depress the float substantially below the level of the liquid when the magnet of said device is energized, and a source of current, a switch, and electrical circuit conductors, said conductors and switch being adapted to interconnect said source with the winding of said device, whereby the accuracy of the indicating system and mechanism may be checked at a definite low level position of said float and whereby indicator readings may be taken prior to and after any actuation of said electro-magnetic device.

3. In combination with the crank case of an internal combustion engine with a float within said crank case, a remotely disposed liquid level indicator means, electrical telemetric means variably operated by said float according to the elevation thereof for correspondingly varying the indication given by said indicator, electromagnetic means comprising an electromagnet having an armature, and means interconnecting said armature and said float, a source of current, an electrical circuit controller and electrical circuit conductors interconnecting said controller, said electromagnet and said source, said controller being positioned in the vicinity of said indicator and adapted to force said float to a known lower elevation than the variable elevation thereof when disposed at the surface of the variable amount of lubricant in the crank case, whereby the operator may check the accuracy of said telemetric means by operation of said manual float depressing means and whereby the operator may by repeated sequential operations of said manual means compare the indications of said indicator at different times when said manual means is inoperative to depress the float and subsequent to depression of said float, and whereby upon manual disabling of said controller, said float will be restored to normal floating position at the surface of the lubricant, the manually controlled movement thereof being effective to dislodge sludge from said float.

JOHN F. WERDER.